United States Patent
Iso et al.

(10) Patent No.: US 10,265,676 B2
(45) Date of Patent: Apr. 23, 2019

(54) METHOD OF MANUFACTURING PACKING AND PACKING

(71) Applicant: IHI Corporation, Koto-ku (JP)

(72) Inventors: Yoshiyuki Iso, Tokyo (JP); Jian Huang, Tokyo (JP); Mariko Saga, Tokyo (JP); Shinsuke Matsuno, Tokyo (JP); Hiroyuki Uchida, Tokyo (JP); Naoki Fujiwara, Tokyo (JP); Kenji Takano, Tokyo (JP); Kenji Tokuda, Tokyo (JP)

(73) Assignee: IHI Corporation, Koto-ku (JP)

( * ) Notice: Subject to any disclaimer, the term of this patent is extended or adjusted under 35 U.S.C. 154(b) by 272 days.

(21) Appl. No.: 15/278,897

(22) Filed: Sep. 28, 2016

(65) Prior Publication Data

US 2017/0014797 A1  Jan. 19, 2017

Related U.S. Application Data

(63) Continuation of application No. PCT/JP2015/058810, filed on Mar. 24, 2015.

(30) Foreign Application Priority Data

Apr. 1, 2014 (JP) ................................. 2014-075098

(51) Int. Cl.
| | |
|---|---|
| *B01J 19/24* | (2006.01) |
| *B01J 19/32* | (2006.01) |
| *B01D 53/78* | (2006.01) |
| *B01D 3/00* | (2006.01) |

(Continued)

(52) U.S. Cl.
CPC .............. *B01J 19/32* (2013.01); *B01D 1/007* (2013.01); *B01D 1/0064* (2013.01); *B01D 3/008* (2013.01);

(Continued)

(58) Field of Classification Search
CPC ...... B01D 1/0064; B01D 1/007; B01D 3/008; B01D 53/1475; B01D 53/185;

(Continued)

(56) References Cited

U.S. PATENT DOCUMENTS

| | | | | |
|---|---|---|---|---|
| 3,743,256 A | * | 7/1973 | Oplatka .................. | F28F 25/06 261/98 |
| 4,009,229 A | * | 2/1977 | Szucs ........................ | F28C 1/04 261/72.1 |

(Continued)

FOREIGN PATENT DOCUMENTS

| | | |
|---|---|---|
| EP | 1 249 273 A1 | 10/2002 |
| JP | 54-48681 | 4/1979 |

(Continued)

OTHER PUBLICATIONS

International Search Report dated Jun. 2, 2015 in PCT/JP2015/058810, filed Mar. 24, 2015 (with English Translation).

(Continued)

*Primary Examiner* — Charles S Bushey
(74) *Attorney, Agent, or Firm* — Oblon, McClelland, Maier & Neustadt, L.L.P.

(57) ABSTRACT

A method of manufacturing packing includes: determining types of a gas and a liquid which are brought into gas-liquid contact and a main plate to be used; calculating a relationship between a contact angle and a liquid film length ratio; determining the arrangement (intervals) of a rib; determining rib conditions; calculating the minimum value of the flow direction length of the rib satisfying the contact angle and a strength requirement; confirming whether or not a liquid film length is greater than the minimum value; and determining the flow direction length of the rib within a range from the minimum value to the liquid film length.

3 Claims, 7 Drawing Sheets

(51) Int. Cl.
*B01D 53/14* (2006.01)
*B01D 53/18* (2006.01)
*B01D 1/00* (2006.01)
*B01D 53/62* (2006.01)

(52) U.S. Cl.
CPC ....... *B01D 53/1475* (2013.01); *B01D 53/185* (2013.01); *B01D 53/62* (2013.01); *B01D 53/78* (2013.01); *B01J 19/247* (2013.01); *B01D 2252/20484* (2013.01); *B01D 2257/302* (2013.01); *B01D 2257/404* (2013.01); *B01D 2257/504* (2013.01); *B01D 2258/0283* (2013.01); *B01J 2219/328* (2013.01); *B01J 2219/3221* (2013.01); *B01J 2219/32206* (2013.01); *B01J 2219/32213* (2013.01); *B01J 2219/32227* (2013.01); *B01J 2219/32251* (2013.01); *B01J 2219/32408* (2013.01); *Y02C 10/06* (2013.01)

(58) Field of Classification Search
CPC ................. B01D 53/62; B01D 53/78; B01D 2252/20484; B01D 2257/302; B01D 2257/404; B01D 2257/504; B01D 2258/0283; B01J 19/32; B01J 19/247; B01J 2219/32206; B01J 2219/3221; B01J 2219/32213; B01J 2219/32227; B01J 2219/32251; B01J 2219/32408; B01J 2219/328; Y02C 10/06
USPC .............................. 261/112.1, 112.2, DIG. 72
See application file for complete search history.

(56) References Cited

U.S. PATENT DOCUMENTS

| | | |
|---|---|---|
| 4,296,050 A | 10/1981 | Meier |
| 4,497,753 A | 2/1985 | Streiff |
| 5,063,000 A | 11/1991 | Mix |
| 5,536,454 A | 7/1996 | Fujii et al. |
| 9,815,018 B2 * | 11/2017 | Huang .................. B01D 53/62 |
| 2002/0178925 A1 | 12/2002 | Mimura et al. |
| 2004/0228777 A1 | 11/2004 | Mimura et al. |
| 2007/0039182 A1 | 2/2007 | Mimura et al. |
| 2008/0017497 A1 | 1/2008 | Werlen et al. |
| 2013/0001812 A1 | 1/2013 | Yaegar et al. |
| 2013/0127075 A1 | 5/2013 | Tsujiuchi et al. |
| 2013/0313103 A1 | 11/2013 | Billingham et al. |
| 2014/0131902 A1 | 5/2014 | Huang et al. |
| 2016/0263548 A1 | 9/2016 | Bellingham et al. |
| 2018/0207544 A1 * | 7/2018 | Iso ........................... B01D 3/26 |

FOREIGN PATENT DOCUMENTS

| | | |
|---|---|---|
| JP | 55-97243 | 7/1980 |
| JP | 2-207837 | 8/1990 |
| JP | 5-103977 | 4/1993 |
| JP | 6-210121 | 8/1994 |
| JP | 6-269628 | 9/1994 |
| JP | 6-269629 | 9/1994 |
| JP | 7-80288 A | 3/1995 |
| JP | 7-121357 | 12/1995 |
| JP | 2003-340268 | 12/2003 |
| JP | 2010-62111 | 3/2010 |
| JP | 2012-120999 | 6/2012 |
| JP | 2013-17982 | 1/2013 |
| WO | WO 2013/015415 A1 | 1/2013 |

OTHER PUBLICATIONS

Written Opinion dated Jun. 2, 2015 in PCT/JP2015/058810, filed Mar. 24, 2015.

Extended European Search Report dated Aug. 23, 2017 in Patent Application No. 15773307.2.

* cited by examiner

METHOD OF MANUFACTURING PACKING AND PACKING

CROSS REFERENCE TO RELATED APPLICATIONS

This application is a continuation application of International Application No. PCT/JP2015/058810, filed on Mar. 24, 2015, which claims priority to Japanese Patent Application No. 2014-075098, filed on Apr. 1, 2014, the entire contents of which are incorporated by reference herein.

BACKGROUND

1. Technical Field

The present disclosure relates to a method of manufacturing packing and packing, and more particularly relates to a method of manufacturing packing which is suitable for a gas separation device that makes a separation target gas such as carbon dioxide contained in a processing gas such as an exhaust gas chemically react with a reaction liquid so as to separate or recover it and to packing.

2. Description of the Related Art

Conventionally, in a chemical plant, a thermal power plant and the like, gas separation devices (for example, a distillation tower, an absorption tower and a purification tower) are used which separate a specific gas from a processing gas such as an exhaust gas containing various types of gases. These gas separation devices make a reaction liquid such as a monoethanolamine aqueous solution chemically react with a separation target gas such as carbon dioxide so as to separate or recover the separation target gas. The gas separation device includes packing which increases a contact area between the reaction liquid and the separation target gas, and brings, on the surface of the packing, the reaction liquid and the separation target gas into gas-liquid contact with each other to make them chemically react with each other.

However, the reaction liquid may not uniformly flow on the surface of the packing due to the effect of surface tension, and the liquid film of the reaction liquid flowing on the surface of the packing converges (hereinafter referred to as "liquid film rupture" or "liquid filmbreak up"), with the result that the contact area between the reaction liquid and the separation target gas may be reduced. The gas-liquid contact area is reduced, and thus the reaction liquid converges to increase the flow speed of the reaction liquid, with the result that the residence time of the reaction liquid on the surface of the packing is reduced. Consequently, there has been such a problem that the chemical reaction amount of the reaction liquid and the separation target gas is decreased.

Hence, a gas-liquid contact device disclosed in Japanese Patent Application Laid-Open Publication No. 06-210121 (Patent Literature 1) includes packing which is formed with a tubular structure having a lattice-shaped cross section, and is configured such that the gas-liquid contact surface of the packing includes a rough surface portion having a center line average roughness of 50 μm or more and a porous surface portion having a plurality of drilled holes or a net-like material. With such a configuration, it is possible to increase the gas-liquid contact area, and thus it is possible to enhance the gas-liquid contact efficiency. Japanese Patent Application Laid-Open Publication No. 06-269628 (Patent Literature 2) discloses a product in which a gas-liquid contact surface is formed of a material obtained by adhering a net-like member to the surface of a plate-like member (packing).

SUMMARY

However, in the packing of the tubular structure as disclosed in Patent Literatures 1 and 2 described above, there has been such a problem that the weight of the packing is easily increased, and thus the weight or size of the entire device is increased. Moreover, there has been such a problem that the flow path of a gas for the packing is easily narrowed, and thus the size of the entire device is increased in order to ensure the area of the gas flow path.

Furthermore, in the packing of the plate-like member as disclosed in Patent Literature 2, there has been such a problem that, since the stiffness of the net-like member such as a metallic mesh or three-dimensional knitting is low, it is difficult to make it self-supporting by itself or to form plate-like members such that they are spaced uniformly, and thus support members for the net-like member and the like are needed, with the result that the weight of the packing is increased.

The present disclosure has been made in view of such problems. An object of the present disclosure is to provide a method of manufacturing packing and packing in which a liquid film rupture is unlikely to occur and in which it is possible to reduce the weight thereof.

A first aspect of the present disclosure is a method of manufacturing packing that includes a main plate for forming a liquid film constituting a gas-liquid contact surface, the method including: when arranging a rib along a flow direction of the liquid film, calculating a relationship between a contact angle of the liquid film on a surface of the rib and a liquid film length ratio indicating a ratio of a liquid film length until the liquid film is ruptured to a flow direction length of the main plate, and determining a design condition of the rib on the basis of a correlation between the contact angle and the liquid film length ratio.

In the rib, the contact angle may be adjusted so that the liquid film length ratio satisfies a predetermined reference value or a flow direction length of the rib may be adjusted so that the liquid film is not ruptured.

Further, the method of manufacturing packing may include: a main condition determination step of determining types of a gas and a liquid which are brought into gas-liquid contact and a condition of the main plate; a numerical analysis step of calculating a relationship between the contact angle and the liquid film length ratio; a rib arrangement determination step of determining an arrangement of the rib; a rib condition determination step of determining a material and a surface shape of the rib; a rib property determination step of determining a minimum value of the flow direction length of the rib satisfying the contact angle and a strength requirement; a minimum value condition confirmation step of confirming whether or not a liquid film length with respect to the contact angle is greater than the minimum value of the flow direction length satisfying the strength requirement; and a rib length determination step of determining the flow direction length of the rib within a range from the minimum value of the flow direction length satisfying the strength requirement to the liquid film length with respect to the contact angle.

A second aspect of the present disclosure is a packing that includes a main plate for forming a liquid film constituting a gas-liquid contact surface, the packing including: a plurality of ribs which is arranged along a flow direction of the liquid film, wherein a relationship between a contact angle of the liquid film on a surface of each of the ribs and a liquid film length ratio indicating a ratio of a liquid film length until the liquid film is ruptured to a flow direction length of the main plate is calculated, and then the ribs are designed on the basis of a correlation between the contact angle and the liquid film length ratio.

In the ribs, the contact angle may be adjusted so that the liquid film length ratio satisfies a predetermined reference value or a flow direction length of the ribs may be adjusted so that the liquid film is not ruptured. Further, the ribs may be fittings which are arranged in a zigzag manner.

When a plurality of pieces of the packing is arranged in parallel, the ribs may be brought into contact with a back surface of the adjacent piece of the packing. Furthermore, the ribs may be arranged so as to be aligned in a row in a vertical direction with respect to the main plate. Moreover, the main plate may be formed of an expanded metal.

The present disclosure is based on the following findings in a research on packing by the present inventors. Specifically, it is found that a liquid film rupture is affected by the wettability of a rib, when the rib is arranged on the main plate of the packing. For example, when the wettability of the rib is excessively excellent, the liquid film in the vicinity of the rib formed on the surface of the main plate is displaced to the surface of the rib, and thus a thin portion of the liquid film is formed in the vicinity of a boundary portion between the rib and the main plate, which causes the liquid film to be ruptured. Further, when the wettability of the rib is unsatisfactory, the liquid film in the vicinity of the rib formed on the surface of the main plate is not placed on the surface of the rib, and thus a thin portion of the liquid film is formed in the boundary portion between the rib and the main plate, which causes the liquid film to be ruptured.

According to the method of manufacturing the packing and the packing of the present disclosure described above, the design conditions of the rib are determined based on the correlation between the contact angle of the rib and the liquid film length ratio, and thus it is possible to adjust the contact angle of the rib to be such a value that a liquid film rupture is unlikely to occur and to adjust the rib to have such a length that a liquid film rupture is unlikely to occur. Further, the rib is arranged on the surface of the main plate, and thus it is possible to reinforce the main plate with the rib and it is also possible to reduce the weight of the packing.

DESCRIPTION OF THE EMBODIMENTS

Figure 1A:
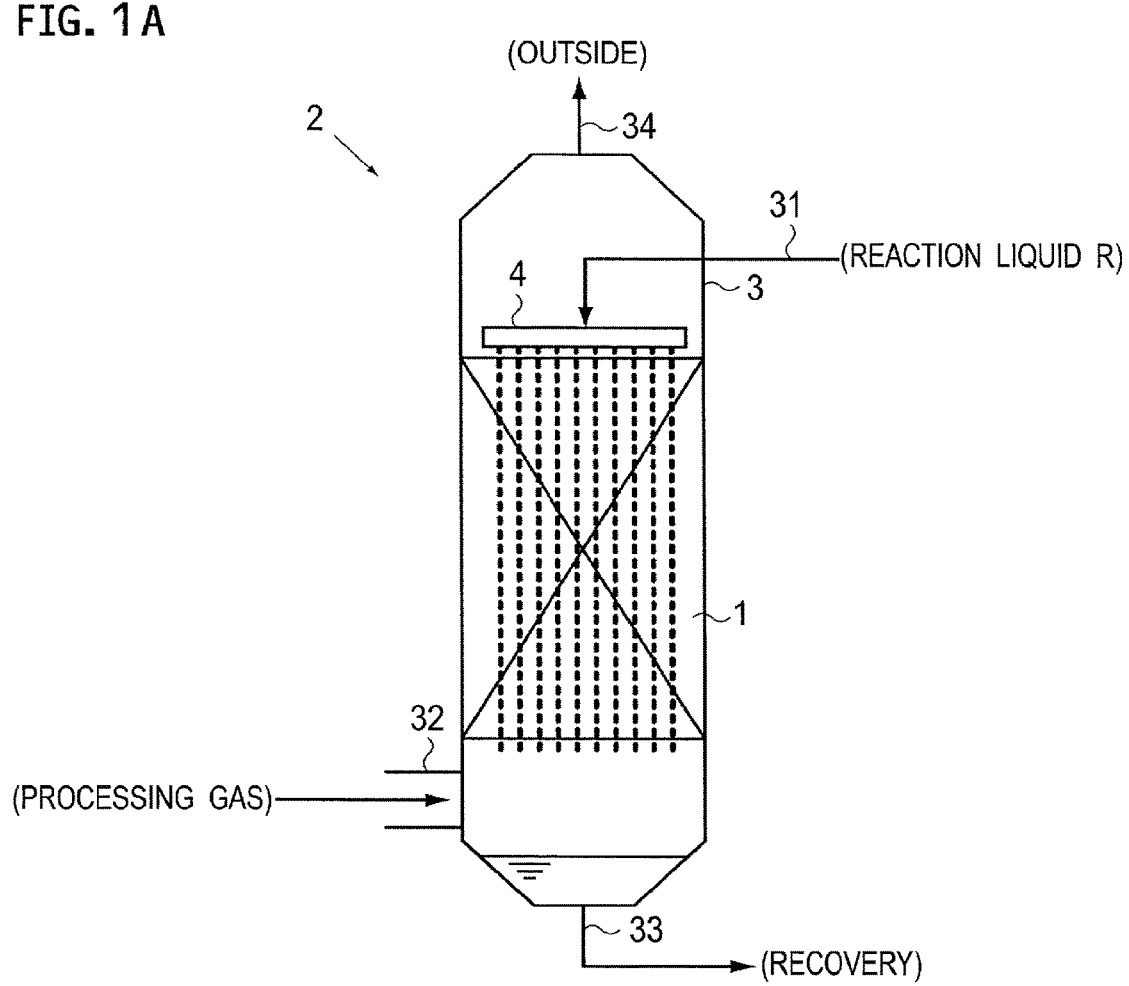
FIGS. 1A and 1B are diagrams showing a gas separation device using packing according to an embodiment of the present disclosure, and show an overall configuration diagram thereof and a cross-sectional view of the packing, respectively.
Figure 1B:
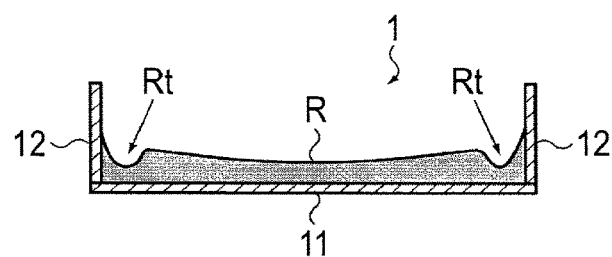
Figure 2:
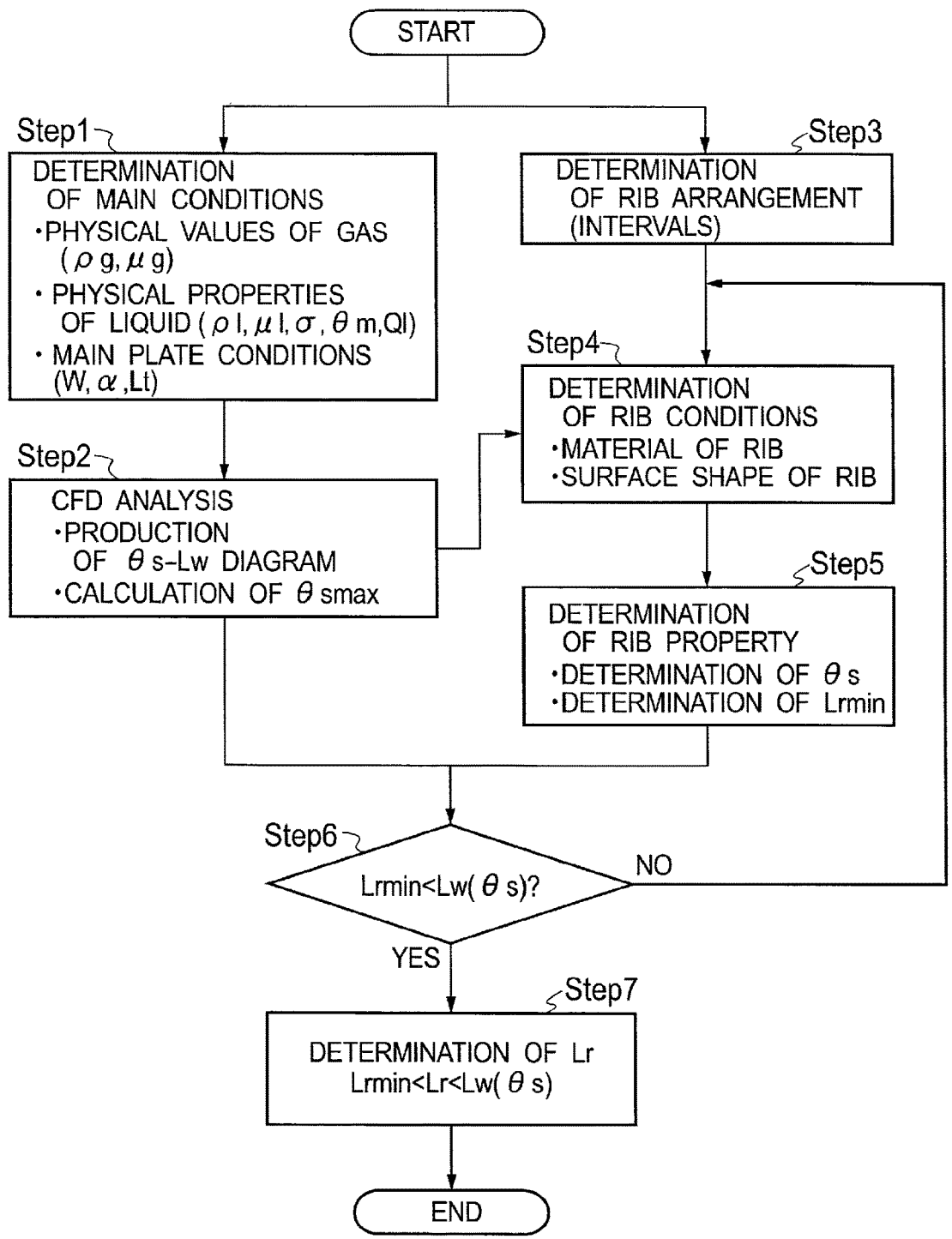
FIG. 2 is a flow diagram showing a method of manufacturing the packing according to the embodiment of the present disclosure.

An embodiment of the present disclosure will be described below with reference to FIGS. 1A to 7B. Here, FIGS. 1A and 1B are diagrams showing a gas separation device using packing according to the present embodiment, and show an overall configuration diagram and a cross-sectional view of the packing, respectively. FIG. 2 is a flow diagram showing a method of manufacturing the packing according to the present embodiment.

In the gas separation device 2 using the packing 1 according to the present embodiment, as shown in FIG. 1A, a reaction liquid R is made to flow downward on the surface of the plate-like packing 1 arranged within a reaction container 3, and a processing gas containing a separation target gas is supplied into the reaction container 3. While the reaction liquid R flows downward on the surface of the packing 1, a liquid film of the reaction liquid R is formed on the surface. The processing gas within the reaction container 3 makes contact with the liquid film (makes so-called gas-liquid contact therewith), thus the separation target gas is made to chemically react so as to be separated from the processing gas and the separated processing gas is recovered. The packing 1 is manufactured based on, for example, the flow diagram shown in FIG. 2.

The reaction container 3 has a substantially cylindrical shape and forms the outer envelope of the gas separation device 2. In an upper portion of the reaction container 3, a reaction liquid supply line 31 is arranged which supplies the reaction liquid R into the gas separation device 2. The reaction liquid R may be supplied into the reaction liquid supply line 31 after being purified within a facility such as a chemical plant or a thermal power plant. Alternatively, the reaction liquid R may be supplied into the reaction liquid supply line 31 from a storage tank in which the purified reaction liquid R is stored.

Further, the reaction liquid supply line 31 is connected to distribution pipes 4 which are arranged above the packing 1. The distribution pipes 4 are arranged above the packing 1 parallel to each other or in a lattice shape. In a lower portion of each of the distribution pipes 4, an opening portion for discharging the reaction liquid R is formed. Note that the distribution pipe 4 is not limited to the illustrated structure, and a conventionally and generally used distributor such as a distribution nozzle can be used as necessary.

Furthermore, in a lower portion of the reaction container 3, a processing gas supply pipe 32 is arranged which supplies the processing gas into the gas separation device 2. The processing gas is, for example, a waste gas (exhaust gas) or a reaction gas produced within a facility such as a chemical plant or a thermal power plant, and is supplied into the processing gas supply pipe 32 from the facility used in the preceding process. Although here, it is configured such that the reaction liquid R is made to flow downward from the upper portion to the lower portion of the reaction container 3 whereas the processing gas is made to flow in the opposite direction from the lower portion to the upper portion of the reaction container 3, the configuration is not limited to such a configuration, and for example, the processing gas may also be made to flow in the opposite direction from the upper portion to the lower portion of the reaction container 3.

Further, a waste liquid discharge line 33 for recovering the used reaction liquid (waste liquid) R which has passed through the packing 1 to chemically react with the processing gas is connected to the bottom portion of the reaction container 3. The used reaction liquid R (waste liquid) is temporarily stored in the bottom portion of the reaction container 3, is discharged, as necessary, from the waste liquid discharge line 33 to the outside and is recovered.

Furthermore, a waste processing gas discharge line 34 that discharges the processing gas (waste processing gas) which has passed through the packing 1 to chemically react with the reaction liquid R and from which the separation target gas is removed is connected to the ceiling portion of the reaction container 3. The processing gas (waste processing gas) which has been processed is discharged from a chimney into the atmosphere or is transported to a processing facility used in the succeeding process.

Note that, in the reaction container 3, a cooling device which cools the waste processing gas, a drain recovery device which discharges a drain or the like may be arranged as necessary as in a conventional gas separation device 2.

For example, as shown in FIG. 1B, the packing 1 includes a main plate 11 for forming the liquid film of the reaction liquid R constituting the gas-liquid contact surface and a rib 12 arranged along the flow direction of the liquid film of the reaction liquid R. The main plate 11 is formed of, for example, an expanded metal. However, the main plate 11 may be formed with a metallic thin plate. The material and the shape (length×width) of the main plate 11 are previously determined (selected) by the size of the reaction container 3, the types and concentrations of the processing gas and the reaction liquid R and the like.

The expanded metal is a plate member which is obtained by making zigzag cuts (slits) in a metal plate such as a stainless steel plate, an aluminum plate or a steel plate, drawing the metal plate in a direction substantially orthogonal to the direction in which the cuts are extended and processing the metal plate in a mesh shape. As the main plate 11, the expanded metal is adopted, and thus it is possible to reduce the weight while maintaining a given strength due to the mesh structure of the expanded metal, which makes it possible to make the main plate 11 self-supporting by the expanded metal alone. Further, the expanded metal is used, and thus it is possible to easily form a plurality of opening portions and projections and recesses in the surface of the main plate 11, to enhance performance for holding the liquid film and to enhance the reaction efficiency.

Incidentally, as shown in FIG. 1B, in the packing 1 having the main plate 11 and the rib 12, part of the liquid film formed on the main plate 11 is displaced to the surface of the rib 12 due to the wettability of the rib 12, and thus a thin portion of the liquid film (hereinafter, a thin portion Rt) is formed in the vicinity of the rib 12. The present inventors have clarified that the thin portion Rt affects a liquid film rupture (a liquid film break up), and thereby conceive the present disclosure.

As shown in FIG. 2, the method of manufacturing the packing according to the present embodiment is a method of manufacturing the packing 1 which includes the main plate 11 for forming the liquid film constituting the gas-liquid contact surface. This manufacturing method, when arranging the rib 12 along the flow direction of the liquid film, calculates a relationship between a contact angle θs of the liquid film on the surface of the rib 12 and a liquid film length ratio Lw/Lt indicating a ratio of a liquid film length Lw until the liquid film is ruptured (broken up) to the flow direction length Lt of the main plate 11, and determines design conditions for the rib 12 on the basis of a correlation between the contact angle θs and the liquid film length ratio Lw/Lt.

Specifically, the method of manufacturing the packing 1 according to the present embodiment includes: a main condition determination step Step 1 of determining types of the gas (processing gas) and the liquid (reaction liquid R) which are brought into gas-liquid contact and conditions for the main plate 11; a numerical analysis step Step 2 of calculating the relationship between the contact angle θs of the rib 12 and the liquid film length ratio Lw/Lt; a rib arrangement determination step Step 3 of determining the arrangement of the rib 12; a rib condition determination step Step 4 of determining the material and the surface shape (surface texture) of the rib 12; a rib property determination step Step 5 of determining the minimum value Lrmin of the flow direction length of the rib 12 satisfying the contact angle θs and the strength requirements of the rib 12; a minimum value condition confirmation step Step 6 of confirming whether or not the liquid film length Lw (θs) with respect to the contact angle θs of the rib 12 is greater than the minimum value Lrmin of the flow direction length of the rib 12 satisfying the strength requirements; and a rib length determination step Step 7 of determining the flow direction length Lr of the rib 12 within a range from the minimum value Lrmin of the flow direction length of the rib 12 to the liquid film length Lw (θs) with respect to the contact angle θs of the rib 12.

The main condition determination step Step 1 is a step of determining conditions (hereinafter referred to as the "main conditions") necessary for numerical analysis. The conditions for the processing gas (gas) which is the target, the reaction liquid R (liquid) which processes it and the main plate 11 to be used are determined, and thus, for example, it is possible to determine numerical values on the main conditions such as the density $\rho g$ [kg/m$^3$] and the viscosity $\mu g$ [Pa·s] of the gas, the density $\rho l$ [kg/m$^3$], the viscosity $\mu l$ [Pa·S] and the surface tension [N/m] of the liquid, the contact angle θm [° (deg)] with respect to the main plate 11, the flow rate Ql [m$^3$/s], the width W [m] of the main plate 11, the flow direction length Lt [m] and an inclination angle α [° (deg)] of the main plate 11 with respect to a horizontal plane.

The numerical analysis step Step 2 is a step of analyzing the flow of the liquid film based on Computational Fluid Dynamics (so-called CFD analysis). In this analysis, the mass conservation equation (continuity equation) and the momentum conservation equation (Navier-Stokes equation) in one fluid model are solved, and thus the numerical analysis results of a three-dimensional unsteady flow are obtained. Note that, for this analysis, for example, FLUENT (registered trademark, ANSYS, Inc.) which is general-purpose thermal fluid analysis software may be used. Further, the behavior of a gas-liquid interface is predicted with a VOF (Volume of Fluid) model which is one interface tracking method. Furthermore, a turbulence model is not used, the inflow boundary of the liquid is specified under conditions in which the liquid film is constant in thickness, conditions in which the liquid flows in at a uniform flow speed are given, the main plate 11 and the rib 12 are under No-slip conditions and the other boundary surfaces are assumed to be the outflow boundaries of static pressure provisions. Since the CFD analysis is a known analytical method, the detailed description thereof will be omitted here.

The numerical analysis step Step 2 produces a $\theta s$-Lw diagram (correlation diagram) showing the correlation between the contact angle $\theta s$ of the rib 12 and the liquid film length ratio Lw/Lt, and calculates the contact angle $\theta smax$ when the liquid film length Lw is the maximum.

Figure 3A:
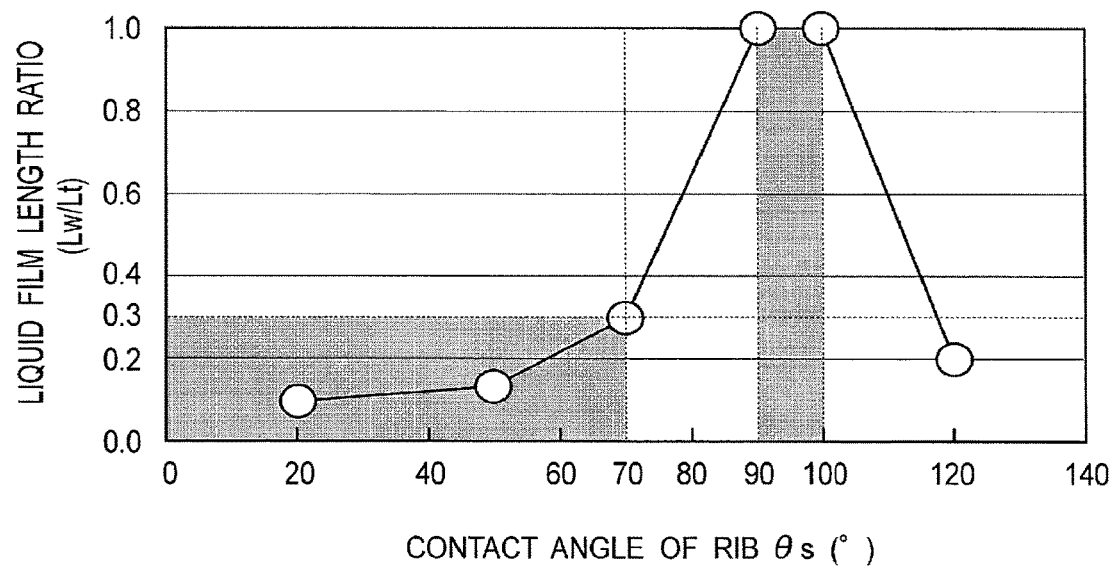
FIGS. 3A and 3B are diagrams showing a correlation between the contact angle of a rib and a liquid film length ratio, and show a correlation diagram and an analytical model, respectively.
Figure 3B:
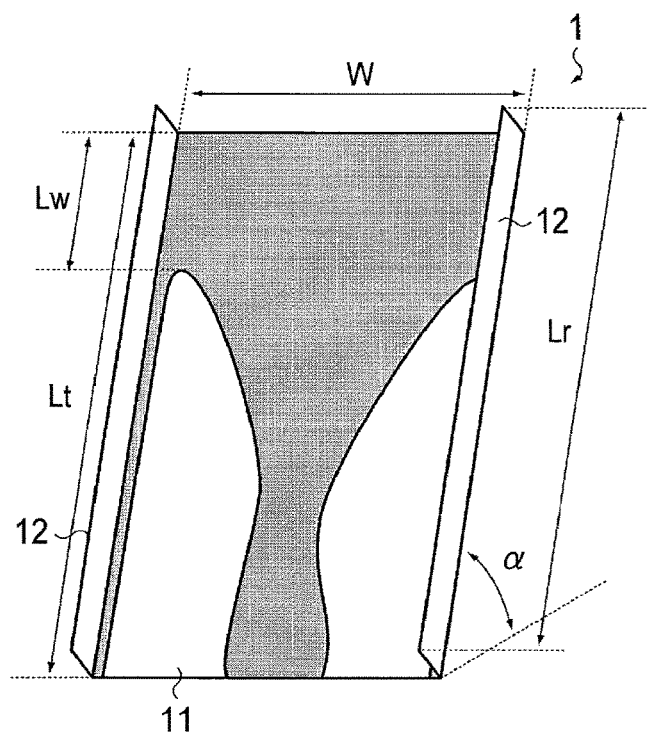

Here, FIGS. 3A and 3B are diagrams showing the correlation between the contact angle of the rib and the liquid film length ratio, and show a correlation diagram and an analytical model, respectively. As shown in FIG. 3B, in the analytical model of the packing 1 used in the numerical analysis step Step 2, the rib 12 of the flow direction length Lr is arranged on both side portions of the main plate 11 having the width W, the flow direction length Lt and the inclination angle $\alpha$, and under the conditions described above, the liquid is made to flow in from the upper end portion of the main plate 11. Further, as shown in the figure, the distance (the liquid film length until the liquid film is ruptured) up to the position in which the liquid film rupture occurs is assumed to be Lw.

FIG. 3A is the correlation diagram between the contact angle $\theta s$ of the rib 12 and the liquid film length ratio Lw/Lt obtained by the CFD analysis. In this analysis, it is assumed that the gas is air, the liquid is water and the main plate 11 is a stainless steel. Further, the inclination angle $\alpha$ is set to 60°, and the atmosphere temperature is set to 20° C. The results of the CFD analysis indicate that in a range where the contact angle $\theta s$ is 90 to 100°, the liquid film length ratio Lw/Lt is 1.0. In other words, the range of the contact angle $\theta smax$ when the liquid film length Lw is the maximum is calculated to be 90 to 100°.

Figure 4:
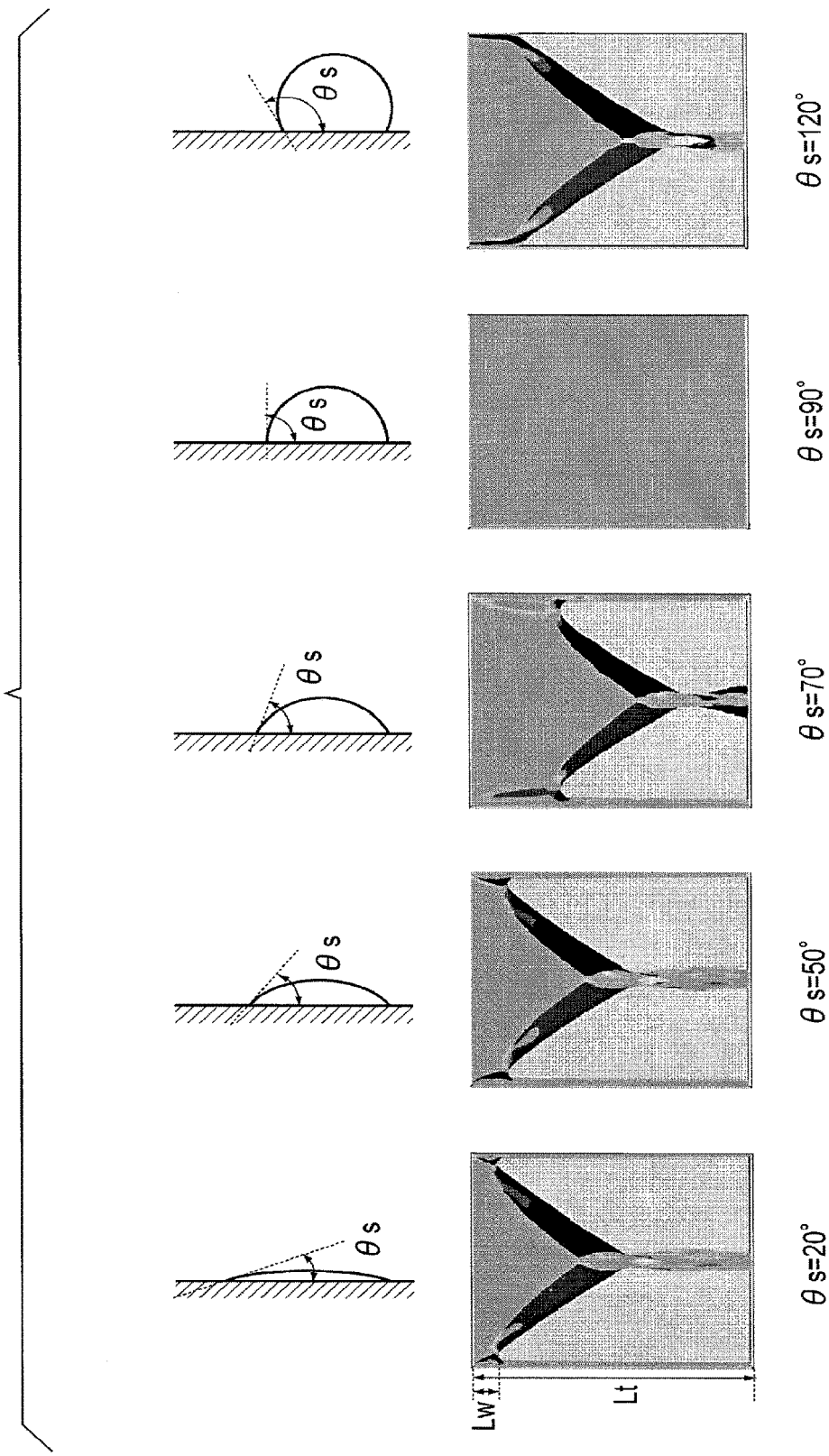
FIG. 4 is a conceptual diagram showing a relationship between the contact angle of the rib and the liquid film length ratio.

Furthermore, the liquid film length ratio Lw/Lt is quadratically increased as the contact angle $\theta s$ is brought from 0° close to 90°. Moreover, when the contact angle $\theta s$ exceeds 100°, the liquid film length ratio Lw/Lt is significantly lowered. Here, FIG. 4 is a conceptual diagram showing a relationship between the contact angle of the rib and the liquid film length ratio. FIG. 4 shows the states of the packing 1 when the contact angle $\theta s$ is 20°, 50°, 70°, 90° and 120°, the upper stage of the figure is an image diagram of the contact angle $\theta s$ and the lower stage of the figure is a plan view of the flow of the liquid film.

When the contact angle $\theta s$ is 20°, 50° and 70°, since the wettability of the rib 12 is excellent, the liquid film in the vicinity of the rib 12 is easily displaced to the surface of the rib 12, and as shown in FIG. 1B, the thin portion Rt is easily formed in the liquid film. Hence, as the contact angle $\theta s$ is smaller (the wettability is better), the liquid film length Lw is decreased.

When the contact angle $\theta s$ is 90°, since the surface of the liquid film formed on the main plate 11 is perpendicularly brought into contact with the rib 12, a small amount of liquid film is displaced to the surface of the rib 12, and thus the thin portion Rt is unlikely to be formed in the liquid film. Hence, the liquid film rupture is unlikely to occur, and thus as shown in the figure, the entire surface of the main plate 11 can be brought into the wet state (liquid film length ratio Lw/Lt=1.0).

When the contact angle $\theta s$ is 120°, since the wettability of the rib 12 is unsatisfactory, the liquid film is not placed on the surface of the rib 12, and the thin portion of the liquid film is easily formed on the surface of the rib 12. Hence, the liquid film is easily separated from the rib 12, and thus as shown in the figure, the liquid film rupture occurs.

As described above, the correlation is present between the contact angle $\theta s$ of the rib 12 and the liquid film rupture (that is, the liquid film length Lw), and the $\theta s$-Lw diagram shown in FIG. 3A is produced, and thus it is possible to determine the design conditions and the properties for the rib 12.

The rib arrangement determination step Step 3 is a step of determining the flow direction length Lr of the rib 12 satisfying the design conditions for the packing 1. The present embodiment illustrates a case where the intervals of the ribs 12 are fixed, and then on the basis of balance between the strength requirements and the wettability, the flow direction length Lr of the rib 12 is determined. Note that, when the arrangement (intervals) of the ribs 12 is changed, it is necessary to redo the processing from the start.

The rib condition determination step Step 4 is a step of determining at least the design conditions (hereinafter referred to as the "rib conditions") such as the material and the surface shape (for example, the surface roughness) of the rib 12. Even when any gas or liquid is selected or even when any main plate 11 is used, it is inferred that the $\theta s$-Lw diagram shown in FIG. 3A has substantially the same correlation. Hence, the material and the surface shape of the rib 12 are adjusted so that the contact angle $\theta s$ of the liquid with respect to the rib 12 is 90°, and thus it is possible to increase the liquid film length Lw and to suppress the occurrence of the liquid film rupture.

Note that, as a method of changing the surface shape when the rib 12 is produced, a method of changing the material of the rib 12, a method of changing the surface roughness (such as sanding or sandblasting processing), a method of coating the surface, a method of forming small projections and recesses in the surface, a method of performing ultraviolet-ozone processing or plasma processing on the surface and the like can be considered.

Further, since the contact angle $\theta s$ is also changed by the physical properties (such as density, surface tension and viscosity) of the liquid flowing on the surface of the main plate 11, the physical properties of the liquid are changed within a range not affecting the performance for sucking the liquid, and thus it is also possible to adjust the contact angle $\theta s$. Hence, instead of or in addition to the adjustment of the material and the surface shape of the rib 12, the physical properties of the liquid are adjusted, and thus it is also possible to adjust the contact angle $\theta s$ so that the contact angle $\theta s$ is a predetermined value (for example, 90°).

The rib condition determination step Step 4 determines the material and the surface shape of the rib 12 in consideration of the $\theta s$-Lw diagram produced in the numerical analysis step Step 2. Here, the contact angle $\theta s$ of the rib 12 is preferably determined so as to approach the contact angle $\theta smax$ when the liquid film length Lw is the maximum. Further, for example, the conditions of the rib may be determined within a range in which the liquid film length ratio Lw/Lt of the rib 12 satisfies a predetermined reference value (for example, 0.8 or more, 0.9 or more or 1.0), with reference to the value of the contact angle $\theta s$. Furthermore, for example, the conditions of the rib may be determined within a range in which the contact angle $\theta s$ of the rib 12 satisfies a predetermined reference value (for example, 80 to 110°, 90 to 100° or 90°, with reference to the value of the liquid film length ratio Lw/Lt).

The rib property determination step Step 5 is a step of determining the properties (hereinafter referred to as the "rib properties") such as the minimum value Lrmin of the flow direction length of the rib 12 satisfying the contact angle $\theta s$ and the strength requirements of the rib 12, on the basis of the determined design conditions of the rib 12. In the rib condition determination step Step 4, the contact angle θs of the rib 12 is determined in consideration of the θs-Lw diagram. The minimum value Lrmin of the flow direction length satisfying the strength requirements may be calculated by the FEM (finite element method) analysis of the rib 12 or may be calculated by a compression test or the like.

The minimum value condition confirmation step Step 6 is a step of calculating the liquid film length Lw (θs) with respect to the contact angle θs of the rib 12, on the basis of the rib properties determined in the rib property determination step Step 5 and the θs-Lw diagram (correlation diagram) produced in the numerical analysis step Step 2, and of confirming whether or not the liquid film length Lw (θs) is greater than the minimum value Lrmin of the flow direction length calculated in the rib property determination step Step 5.

For example, in a case of Lw (θs)≤Lrmin, when the flow direction length Lr of the rib 12 is set within a range of Lr≤Lw (θs), even if the occurrence of the liquid film rupture can be suppressed, it is impossible to satisfy the strength requirements. Further, in a case of Lw (θs)≤Lrmin, when the flow direction length Lr of the rib 12 is set within a range of Lw (θs)<Lr≤Lrmin, it is impossible not only to satisfy the strength requirements but also to suppress the occurrence of the liquid film rupture.

Hence, in the present embodiment, whether or not the rib properties satisfy at least the condition of Lrmin<Lw (θs) is confirmed. When this condition is not satisfied (N), the process returns to the rib condition determination step Step 4, and the conditions of the rib are reviewed. On the other hand, when this condition is satisfied (Y), the process moves to the rib length determination step Step 7 where the flow direction length Lr of the rib 12 is determined.

The rib length determination step Step 7 is a step of finally determining the flow direction length Lr of the rib 12. Here, the flow direction length Lr of the rib 12 is determined so as to satisfy the condition of Lrmin<Lr<Lw (θs). Since the flow direction length Lr of the rib 12 also functions as the strength member of the packing 1, the flow direction length Lr of the rib 12 needs to satisfy the strength requirements. Hence, the flow direction length Lr of the rib 12 is required to be greater than the minimum value Lrmin of the flow direction length of the rib 12 satisfying the strength requirements. Further, the flow direction length Lr of the rib 12 needs to have such a length as to suppres the occurrence of the liquid film rupture. Furthermore, when Lr=Lw (θs) is set, the liquid film rupture may be unstable. Hence, the flow direction length Lr of the rib 12 is preferably less than the liquid film length Lw (θs) at the contact angle θs.

For example, when the minimum value Lrmin of the flow direction length of the rib 12 satisfying the strength requirements determined in the rib property determination step Step 5 is expressed by a ratio with respect to the flow direction length Lt of the main plate 11, Lrmin/Lt is assumed to be 0.1. Moreover, when the contact angle θs of the rib 12 determined in the rib property determination step Step 5 is set to 70°, the liquid film length ratio Lw/Lt of the rib 12 is calculated to be 0.3 from the correlation diagram shown in FIG. 3A. Hence, when the flow direction length Lr of the rib 12 is expressed by the ratio with respect to the flow direction length Lt of the main plate 11, the flow direction length Lr of the rib 12 is determined within a range of 0.1<Lr/Lt<0.3.

Incidentally, when in the flow diagram shown in FIG. 2, the design conditions (rib conditions) such as the material and the surface shape of the rib 12 are previously determined, the arrangement (intervals) of the rib is adjusted, and thus it is possible to change the θs-Lw diagram, that is, the liquid film length Lw (θs) at the contact angle θs and modify the physical properties of the liquid and thereby adjust the contact angle θs. Hence, when the conditions in the minimum value condition confirmation step Step 6 are not satisfied, the process may return to the start of the flow diagram to redo the processing from the main condition determination step Step 1 and the rib arrangement determination step Step 3.

The packing 1 manufactured by the method of manufacturing the packing discussed above will then be described. Here, FIGS. 5A to 5D are perspective views showing the packing according to the present embodiment, and show a first example, a second example, a third example and a fourth example, respectively.

The respective examples shown in FIGS. 5A to 5D show the packing 1 manufactured by the manufacturing method described above. In other words, the packing 1 includes the main plate 11 for forming the liquid film constituting the gas-liquid contact surface and a plurality of ribs 12 arranged along the flow direction of the liquid film, and after the calculation of the relationship between the contact angle θs of the liquid film on the surface of the rib 12 and the liquid film length ratio Lw/Lt indicating the ratio of the liquid film length Lw until the liquid film with respect to the flow direction length Lt of the main plate 11 is ruptured, the rib 12 is designed based on the correlation between the contact angle θs and the liquid film length ratio Lw/Lt. For example, the rib 12 has the flow direction length Lr which is specified by the contact angle θs of the reaction liquid R with respect to the rib 12 and which is set to the maximum value or less at which it is possible to obtain the state where the liquid film of the reaction liquid R on the main plate 11 is not ruptured and to the minimum value or more at which the mechanical strength of the rib 12 is ensured.

Figure 5A:
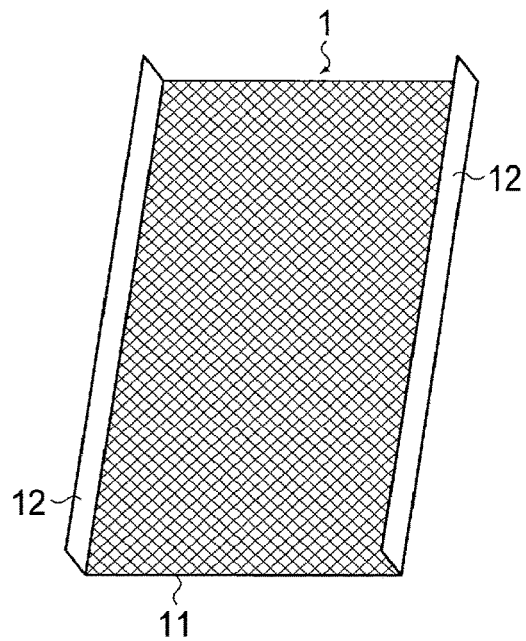
FIGS. 5A to 5D are perspective views showing the packing according to the embodiment of the present disclosure, and show a first example thereof, a second example thereof, a third example thereof and a fourth example thereof, respectively.

In the packing 1 according to the first example shown in FIG. 5A, a pair of ribs 12 are arranged on both side portions of the main plate 11. Here, the main plate 11 is formed of, for example, the expanded metal but may be formed with a metal thin plate. The rib 12 is made to stand vertically with respect to the main plate 11 and is extended in the flow direction of the liquid film (that is, the direction extending from the upper portion to the lower portion of the main plate 11). The rib 12 is formed with, for example, a metal plate but may be formed of the expanded metal. Although here, the case where the rib 12 has the liquid film length ratio Lw/Lt of 1.0 is shown in the figure, the configuration is not limited to such a configuration. The rib 12 is actually formed so as to have the flow direction length Lr determined by the flow described above. Note that, when the rib 12 has a sufficiently small value of the liquid film length ratio Lw/Lt, a plurality of ribs 12 may be arranged along the flow direction of the liquid film.

Figure 5B:
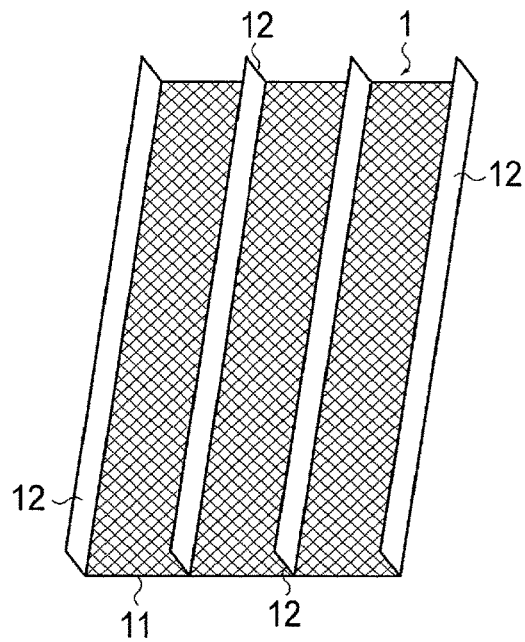

In the packing 1 according to the second example shown in FIG. 5B, the number of ribs 12 is increased as compared with the number of ribs 12 in the first example. Although here, the case where the number of ribs 12 is four is shown in the figure, the number of ribs 12 may be three or five or more. Further, the ribs 12 do not always need to be arranged on both side portions. Furthermore, preferably, in order to make the gas-liquid contact efficiency uniform, all the ribs 12 are designed under the same conditions and are arranged at equal intervals.

Figure 5C:
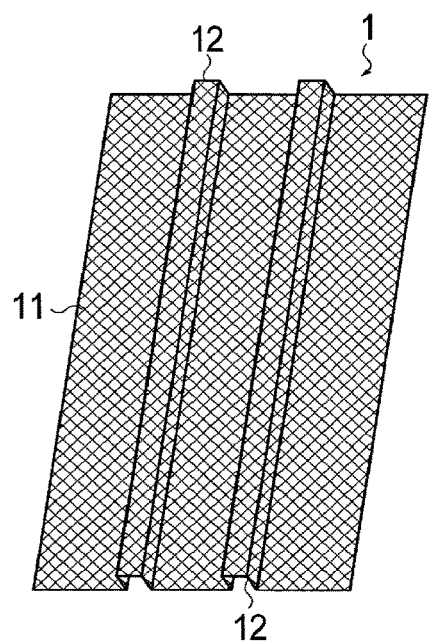

In the packing 1 according to the third example shown in FIG. 5C, the rib 12 is formed by deforming part of the main plate 11 with, for example, bending processing. Although here, the case where the rib 12 has the liquid film length ratio Lw/Lt of 1.0 is shown in the figure, the configuration is not limited to such a configuration. The rib 12 is actually formed so as to have the flow direction length Lr determined by the flow described above. Moreover, when a plurality of ribs 12 is arranged along the flow direction of the liquid film, the rib 12 may be formed by cutting and raising up only part of the main plate 11.

Figure 5D:
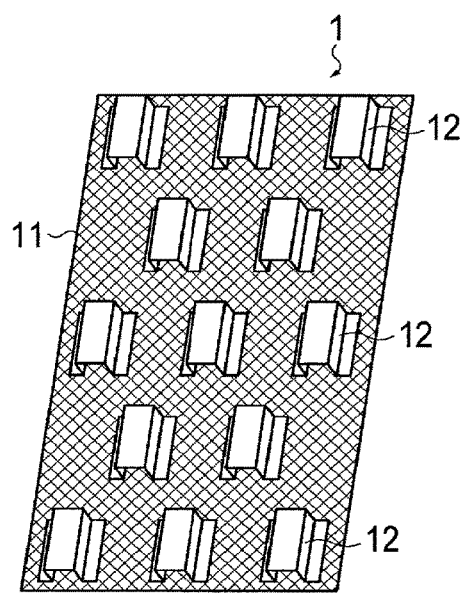

In the packing 1 according to the fourth example shown in FIG. 5D, a plurality of short ribs 12 is arranged on the surface of the main plate 11. The ribs 12 are formed with, for example, fittings (metallic component) arranged in a zigzag manner, and are connected to the main plate 11 by spot welding. The flow direction length Lr of each of the ribs 12 is determined by the flow described above. Note that the arrangement of the ribs 12 is not limited to the zigzag shape, but may be a lattice shape, for example.

Figure 6A:
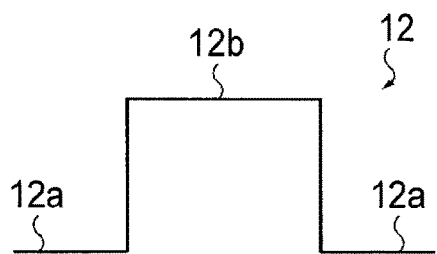
FIGS. 6A to 6F are cross-sectional views of the rib, and show a fourth example shown in FIG. 5D, a first variation, a second variation, a third variation, a fourth variation and a fifth variation, respectively.

Here, FIGS. 6A to 6F are cross-sectional views of the rib 12, and show a fourth example shown in FIG. 5D, a first variation of the rib 12, a second variation of the rib 12, a third variation of the rib 12, a fourth variation of the rib 12 and a fifth variation of the rib 12, respectively. As shown in FIG. 6A, the rib 12 in the fourth example shown in FIG. 5D includes flange portions 12a which are connected to the main plate 11 and a convex portion 12b which is protruded in the shape of a quadrangle (for example, a rectangle or a trapezoid) between the flange portions 12a.

Figure 6B:
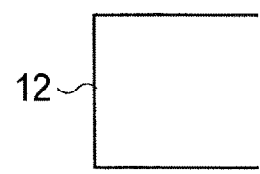
Figure 6C:
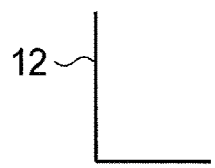
Figure 6D:
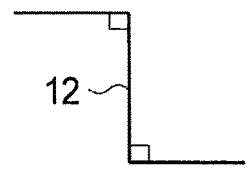
Figure 6E:
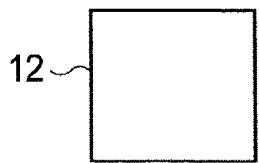

The rib 12 shown in FIG. 6B has a cross section which is formed in a square shape and which is substantially formed in the shape of the letter C, and the lower surface in the figure is connected to the main plate 11. The rib 12 shown in FIG. 6C has a cross section which is formed in the shape of the letter L. The rib 12 shown in FIG. 6D has a cross section which is formed in the shape of the letter Z where its interior angle is 90°. The interior angle in the letter Z may be less than 90°. The rib 12 shown in FIG. 6E has a cross section which is formed in the shape of a quadrangle. The rib 12 may have a cross section which is formed in the shape of a triangle.

Figure 6F:
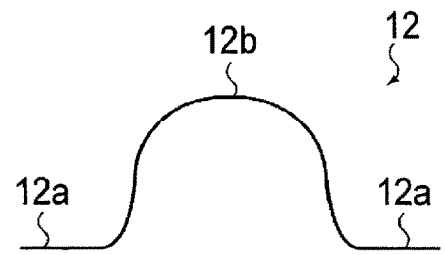

The rib 12 shown in FIG. 6F includes, as with the rib 12 in the fourth example of the packing 1, the flange portions 12a and the convex portion 12b, and the convex portion 12b is formed so as to be protruded in the shape of a smooth curve. Further, the outside portion of the flange portion 12a may be curved upward so that the rib 12 has a waveform cross section.

Figure 7A:
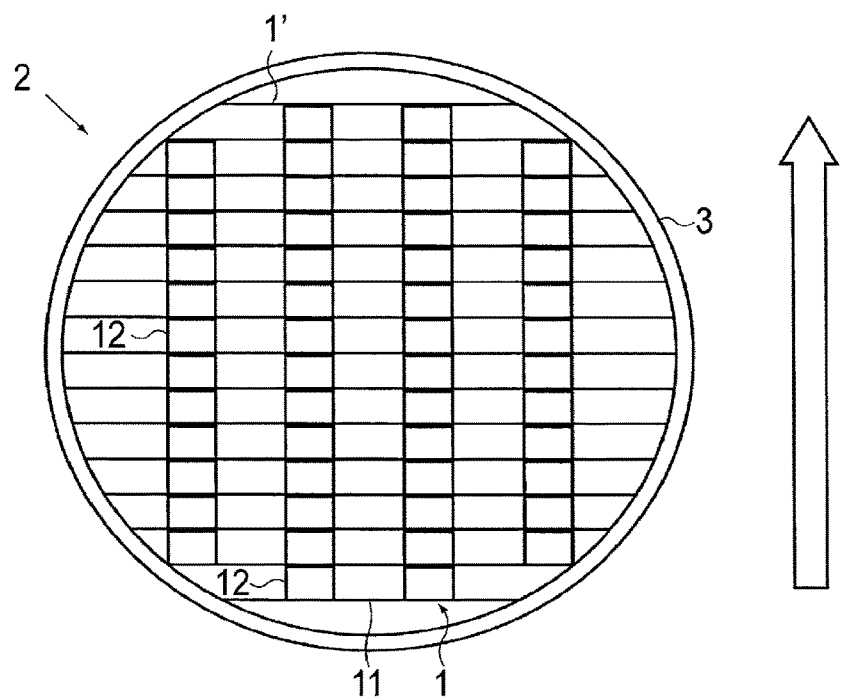
FIGS. 7A and 7B are diagrams each showing a state where a plurality of pieces of the packing according to the embodiment of the present disclosure is arranged in parallel, and show a first example of the arrangement and a second example of the arrangement, respectively.
Figure 7B:
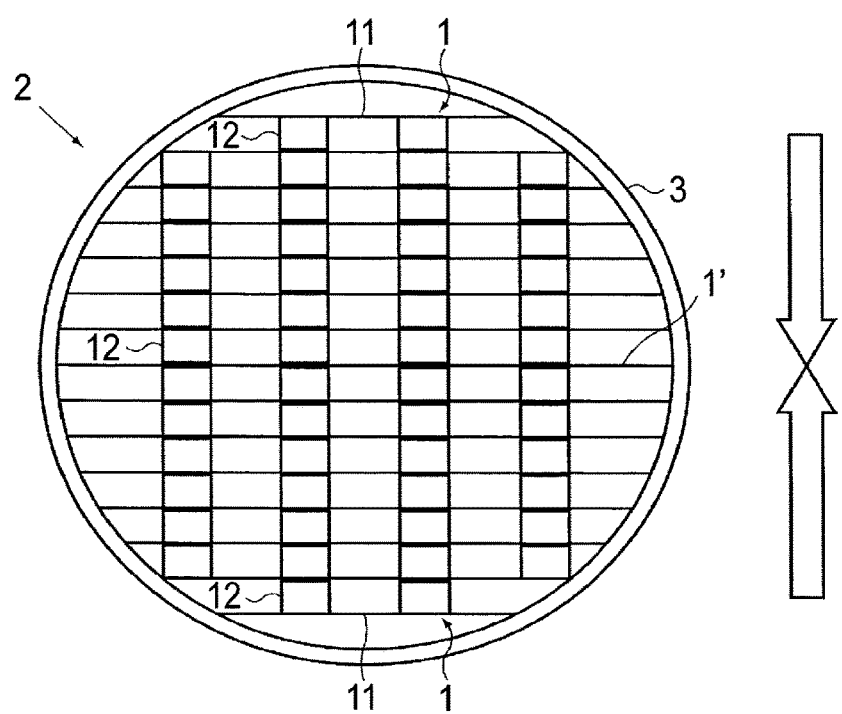

A state where the packing 1 is arranged within the reaction container 3 will then be described. Here, FIGS. 7A and 7B are diagrams each showing a state where a plurality of pieces of the packing according to the present embodiment is arranged, and show a first example of the arrangement and a second example of the arrangement, respectively.

The reaction container 3 has, for example, a cylindrical shape, and a plurality of pieces of the packing 1 is arranged in parallel therewithin. As the packing 1, for example, the packing 1 according to the fourth example shown in FIG. 5D is used. FIG. 7A shows a plurality of pieces of the packing 1 which is arranged in parallel in a state where the surface on which the ribs 12 are connected to the main plate 11 faces upward in the figure. Hence, all pieces of the packing 1 are arranged in a state where the ribs 12 are protruded in an arrow direction in the figure. Note that, since in the packing 1' arranged in the uppermost portion of the figure, the packing 1 adjacent thereto on the surface side is not present, the packing 1' may be formed with only the main plate 11.

Further, the tip end of the rib 12 is arranged so as to make close contact with the back surface of the adjacent packing 1. With such a configuration, the ribs 12 function as the strength member of the packing 1 and also function as spacers which hold constant the intervals of the pieces of the packing 1.

Furthermore, the ribs 12 are preferably arranged so as to be aligned in a row in a vertical direction with respect to the main plate 11. With such a configuration, it is possible to enhance the strength of the aggregation of the pieces of the packing 1 and to effectively suppress the distortion of the main plate 11. Although here, the case where all the ribs 12 are aligned in a row is shown in the figure, the arrangement is not limited to such an arrangement, and the ribs 12 may be arranged so as to be partially aligned in a row. Moreover, a center line when the ribs 12 are aligned is not limited to be linear but may be curved.

FIG. 7B shows the packing 1 in which pieces of the packing 1 on the upper side in the figure differ in direction from those on the lower side. Specifically, in a state where the surface on which the ribs 12 are connected to the main plate 11 faces upward in the figure, a plurality of pieces of the packing 1 is arranged in parallel from the bottom to the center portion whereas in a state where the surface where the ribs 12 are connected to the main plate 11 faces downward in the figure, a plurality of pieces of the packing 1 is arranged in parallel from the top to the center portion. Note that, since in the packing 1' arranged in the center portion of the figure, the ribs 12 are in close contact with both surfaces thereof, the packing 1' which is formed with only the main plate 11 is preferably used.

The gas separation device 2 (see FIG. 1A) using the packing 1 described above can be applied to, for example, a pre-processing tower and an absorption tower within a thermal power plant. For example, when the gas separation device 2 according to the present embodiment is applied to the absorption tower, the processing gas is an exhaust gas supplied from the pre-processing tower, the separation target gas is carbon dioxide and the reaction liquid R is an amine compound aqueous solution. Specifically, the reaction liquid R is, for example, a monoethanolamine (MEA) aqueous solution, and reacts with carbon dioxide to generate a carbamate, an amine salt (carbamate), a carbonate, a bicarbonate or the like.

Note that the packing 1 according to the present embodiment can be applied to devices (such as a distillation tower, a purification tower and an absorption tower) used in various types of chemical plants including chemical processes such as distillation, purification and absorption. Further, the separation target gas is not limited to carbon dioxide and may be an oxidation gas such as NOx or SOx, and the reaction liquid R is not limited to an amine compound aqueous solution and a reaction liquid R suitable for the separation target gas can be arbitrarily selected.

The present disclosure is not limited to the embodiment described above. For example, the arrangements of the pieces of the packing 1 shown in FIGS. 7A and 7B can also be applied to the packing 1 related to each example described previously. Various modifications are possible without departing from the spirit of the present disclosure.

What is claimed is:

1. A method of manufacturing packing that includes a main plate for forming a liquid film constituting a gas-liquid contact surface, the method comprising:

when arranging a rib along a flow direction of the liquid film, calculating a relationship between a contact angle of the liquid film on a surface of the rib and a liquid film length ratio indicating a ratio of a liquid film length until the liquid film is ruptured to a flow direction length of the main plate, and determining a design condition of the rib on the basis of a correlation between the contact angle and the liquid film length ratio.

2. The method of manufacturing packing according to claim 1, wherein in the rib, the contact angle is adjusted so that the liquid film length ratio satisfies a predetermined reference value or a flow direction length of the rib is adjusted so that the liquid film is not ruptured.

3. The method of manufacturing packing according to claim 1, the method further comprising:

determining types of a gas and a liquid which are brought into gas-liquid contact and a condition of the main plate;

calculating a relationship between the contact angle and the liquid film length ratio;

determining an arrangement of the rib;

determining a material and a surface shape of the rib;

determining a minimum value of the flow direction length of the rib satisfying the contact angle and a strength requirement;

confirming whether or not a liquid film length with respect to the contact angle is greater than the minimum value of the flow direction length satisfying the strength requirement; and determining the flow direction length of the rib within a range from the minimum value of the flow direction length satisfying the strength requirement to the liquid film length with respect to the contact angle.

* * * * *